United States Patent
Brehm et al.

(10) Patent No.: US 9,894,127 B2
(45) Date of Patent: Feb. 13, 2018

(54) TIERED SERVICE RESELL MECHANISM FOR IPTV

(75) Inventors: Michael J. Brehm, Allen, TX (US); Corey F. Adams, Frisco, TX (US); Brian C. Westmoreland, Plano, TX (US)

(73) Assignee: Alcatel Lucent, Boulogne-Billancourt (FR)

(*) Notice: Subject to any disclaimer, the term of this patent is extended or adjusted under 35 U.S.C. 154(b) by 507 days.

(21) Appl. No.: 12/627,564

(22) Filed: Nov. 30, 2009

(65) Prior Publication Data

US 2011/0131621 A1   Jun. 2, 2011

(51) Int. Cl.
*H04N 21/237* (2011.01)
*H04L 29/06* (2006.01)
*G06Q 30/06* (2012.01)

(52) U.S. Cl.
CPC ....... *H04L 65/605* (2013.01); *G06Q 30/0613* (2013.01); *H04L 65/4076* (2013.01)

(58) Field of Classification Search
CPC ............. H04N 21/20; H04N 21/23109; H04N 21/232; H04N 21/2353; H04N 21/237
USPC .................... 725/109, 87, 93, 119
See application file for complete search history.

(56) References Cited

U.S. PATENT DOCUMENTS

| | | |
|---|---|---|
| 5,666,645 A | 9/1997 | Thomas et al. |
| 8,037,506 B2 * | 10/2011 | Cooper et al. ........... 725/93 |
| 2002/0138291 A1 * | 9/2002 | Vaidyanathan et al. ......... 705/1 |
| 2006/0235800 A1 | 10/2006 | Furlong et al. |
| 2007/0220575 A1 | 9/2007 | Cooper et al. |
| 2008/0155059 A1 | 6/2008 | Hardin et al. |

FOREIGN PATENT DOCUMENTS

| | | |
|---|---|---|
| CN | 1801695 A | 7/2006 |
| CN | 101395592 A | 3/2009 |
| EP | 1587279 A2 | 10/2005 |
| JP | 2004152310 A | 5/2004 |
| JP | 2004537879 A | 12/2004 |
| WO | 9634486 A1 | 10/1996 |
| WO | 02082814 A2 | 10/2002 |

OTHER PUBLICATIONS

International Search Report and Written Opinion: PCT/US2010/057737 dated Mar. 24, 2011.

* cited by examiner

*Primary Examiner* — Dominic D Saltarelli
(74) *Attorney, Agent, or Firm* — Loza & Loza, LLP

(57) ABSTRACT

A media backend server deployed within an IPTV system and operated by a hosting operator enables tiered reselling of IPTV services to a hosted operator. The media backend server receives a web service call for a plurality of media content from a branch server operated by the hosted operator. The media backend server proxies the web service call to a head end server to retrieve media metadata for at least a portion of the media content. In addition, the media backend server provides filtered media metadata corresponding to media content purchased by the hosted operator from the hosting operator to the branch server.

20 Claims, 3 Drawing Sheets

TIERED SERVICE RESELL MECHANISM FOR IPTV

BACKGROUND OF THE INVENTION

Technical Field of the Invention

The present invention relates in general to IP television (IPTV) systems, and in particular, to resell of IPTV services.

Description of Related Art

With today's widespread use of the Internet as a communication medium, packet-switched networks, such as Internet Protocol (IP), Multiprotocol Label Switching (MPLS), Asynchronous Transfer Mode (ATM) and Ethernet networks, are increasingly being used to transmit digital multimedia data or content (e.g., audio, full-motion audio/video, pictures, etc.). An example of an architecture that uses packet-switched networks to provide real-time (live or video-on-demand) multimedia content to end users is the IP television (IPTV) architecture. Within the IPTV architecture, head end servers obtain media content, such as digital broadcast television programs, and stream the media content over a packet-switched network to one or more set top boxes (STBs) associated with television viewers who have subscribed to receive the television program via backend (middleware) and/or branch media servers.

As the IPTV deployment market saturates for the larger telecom operators, future revenue streams are going to become dependent on the remaining smaller telecom operators. These customers require a low-cost, small-footprint, entry-level solution which provides a similar service offering as the larger operators. However, the significant start-up costs associated with building a video head-end, negotiating and acquiring content licensing from national content providers and/or staffing an operations organization that can maintain a complex IPTV middleware deployment has produced a considerable barrier to entry for smaller operators.

For example, the operator must offer an attractive video package to gain customers, translating to national and premium content as well as an expansive video on demand (VoD) library. Costs for securing contracts with these providers as well as building a head-end for receiving and manipulating this content are exorbitantly high. In addition, a large server farm hosting an IPTV middleware entails an additional large implementation cost. The costs for implementing the network and access portions are then piled on, putting initial startup costs at a level unattainable by many smaller operators. Given the tenuous lending market of today's economy, such startup costs and debt are prohibitive to these operators.

In addition to the cost barrier, these smaller operators are also not staffed to the level of a larger (e.g., Tier-1) operator. In practice, it is common to see three to six engineers being tasked with end-to-end operations of an IPTV solution for even Tier-2 operators. Introducing a complex and operator-intensive middleware platform is a major undertaking for these operators. Their existing staff must be brought up-to-speed quickly and, many times, learning on a live system. Mistakes commonly result in outages of the entire environment. These operational tasks take time away from normal workflow activities of the platform and marketing-related activities which can differentiate the video offering from local competitors.

A hosted IPTV model providing a tiered resell arrangement, in which an operator with a deployed IPTV middleware would resell IPTV services to neighboring operators, thereby hosting subscribers for these neighboring operators and serving content to these subscribers, is being proposed by the inventors as a solution. The hosting operator would generate recurring subscription revenue from the neighboring operators, while the hosted operator(s) would be able to enter into the video market for a nominal start-up cost. For example, only a subset of the required server farm would need to be deployed at the hosted operator facility, thus greatly reducing the startup costs. The hosted operators would then be able to purchase media content already encoded and encrypted per an IPTV middleware specification from a hosting operator for a regular yearly fee, yet still retain the ability to customize the IPTV experience for their own customers.

However, the current IPTV middleware does not natively support a shared IPTV environment between operators. In addition, currently available IPTV middleware is built with the assumption that all content from a video head-end is available to all connected branch servers. There is currently no mechanism to filter content metadata and digital rights management (DRM) keys from the backend servers to the branch servers to provide a customized solution to hosted operators. Therefore, all operators connected to a shared backend server would have access to metadata and DRM keys for all available services, meaning a tiered resell arrangement would be enforced by handshake agreements between operators to not access metadata and/or DRM keys for content they have not purchased. Such a configuration is undesirable to not only the hosted operators and hosting operators, but also to the national content providers.

SUMMARY OF THE INVENTION

Embodiments of the present invention provide a media backend server within an Internet Protocol Television (IPTV) system operated by a hosting operator to enable tiered reselling of IPTV services to a hosted operator. The media backend server includes a network interface, a processor and a memory. The network interface is coupled to a network to receive a web service call for a plurality of media content from a branch server operated by the hosted operator. The processor translates the web service call to a proxy web service call and transmits the proxy web service call via the network interface to a head end server to retrieve media metadata for at least a portion of the media content. The memory maintains operator metadata associated with the hosted operator that indicates the media content purchased by the hosted operator from the hosting operator. The processor identifies filtered media metadata corresponding to the purchased media content to be transmitted to the branch server using the operator metadata, and transmits the filtered media metadata to the branch server via the network interface.

In one embodiment, the processor further operates to filter the received media metadata to produce the filtered media metadata using the operator metadata. In another embodiment, the received media metadata is the filtered media metadata and the processor is further operable to generate the proxy web service call for the filtered media metadata using the operator metadata. In a further embodiment, the web service call includes a source IP address associated with the hosted operator, and the processor is further operable to translate the source IP address to the operator metadata.

In an exemplary embodiment, the media metadata and the filtered media metadata each include a collection of digital rights management (DRM) keys and a collection of available ones of the plurality of media content. In addition, the plurality of media content includes a collection of live media and video on demand media.

Embodiments of the present invention further provide an IPTV system enabling a tiered resell of IPTV services from a hosting operator to a hosted operator. The system includes a branch server operated by the hosted operator and a media backend server operated by the hosting operator. The branch server is coupled to a network to transmit a web service call for a plurality of media content and to receive filtered media metadata corresponding to media content purchased by the hosted operator from the hosting operator. The media backend server is coupled to the network to receive the web service call from the branch server, to proxy the web service call and transmit a proxy web service call to a head end server to retrieve media metadata for at least a portion of the media content and to transmit the filtered media metadata to the branch server.

Embodiments of the present invention further provide a method for enabling tiered reselling of Internet Protocol Television (IPTV) services from a hosting operator to a hosted operator. The method includes receiving a web service call for a plurality of media content from a branch server operated by the hosted operator at a media backend server operated by the hosting operator and translating a source IP address of the web service call to operator metadata associated with the hosted operator, in which the operator metadata indicates media content purchased by the hosted operator from the hosting operator. The method further includes using the operator metadata to retrieve filtered media metadata for the purchased media content and transmitting the filtered media metadata to the branch server.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
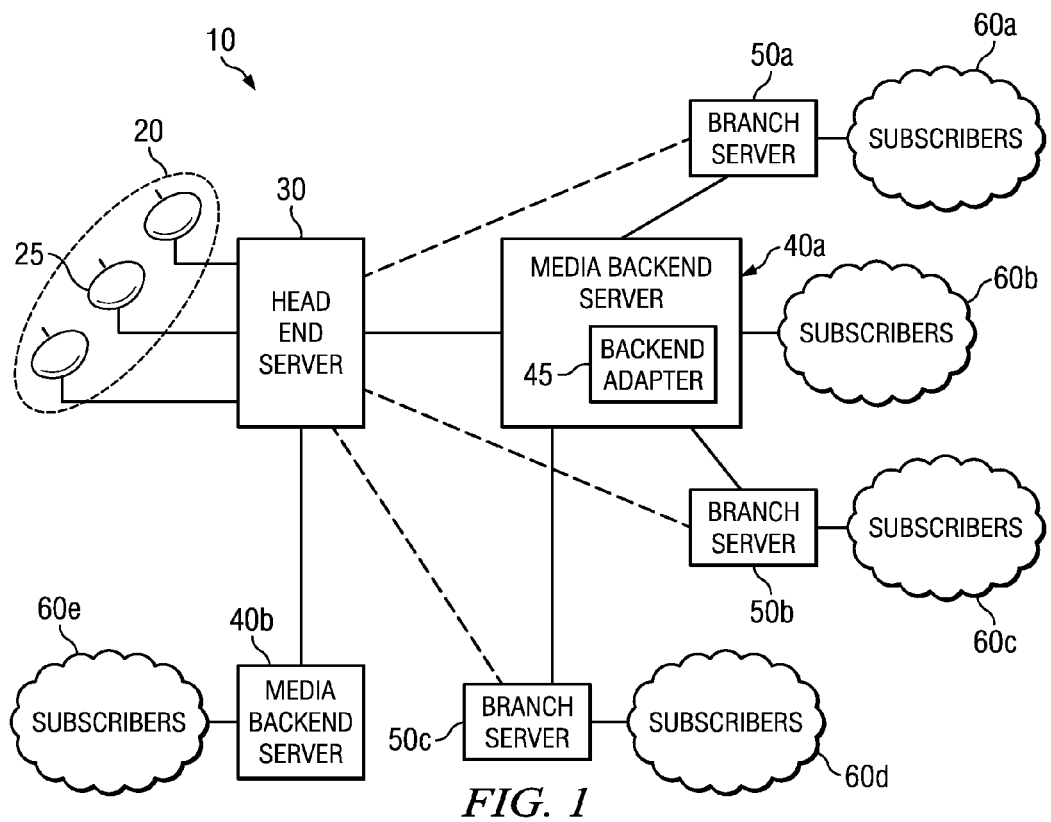
FIG. 1 illustrates an exemplary hosted IPTV system, in accordance with embodiments of the present invention.

Referring to FIG. 1, there is illustrated an exemplary Internet Protocol Television (IPTV) system 10 capable of implementing various embodiments of the present invention. The IPTV system 10 is a hosted IPTV system that enables tiered reselling of IPTV services from a hosting (e.g., Tier 1) operator to hosted (e.g., Tier 2 or Tier 3) operators. Thus, the IPTV system 10 shown in FIG. 1 includes a local head end server 30 and various media backend servers 40a and 40b operated by a hosting operator and branch servers 50a-50c operated by one or more hosted operators. The branch servers 50a-50c can be, for example, IP/Central Offices (IP/COs) including Digital Subscriber Line Access Multiplexers (DSLAMs).

The media backend servers 40a and 40b are each configured to provide IPTV services to subscribers 60b and 60e of the hosting operator, while the branch servers 50a-50c are each configured to provide IPTV to subscribers 60a, 60c and 60d of the hosted operator(s). It should be understood that the media backend servers 40a and 40b can each be coupled to one or more hosting branch servers (not shown) to provide IPTV services to subscribers 60b and 60e.

The head end server 30, media backend servers 40a and 40b and branch servers 50a-50c are all interconnected via a packet-switched network. For example, the packet-switched network may include, but is not limited to, one or more of an Internet Protocol (IP), Multiprotocol Label Switching (MPLS), Asynchronous Transfer Mode (ATM) or Ethernet network.

The head end server 30, media backend servers 40a and 40b and branch servers 50a-50c operate to stream digital audio/video content containing live national and/or local television programs and/or video-on-demand (VoD) programs to one or more subscribers 60a-60e. For example, as shown in FIG. 1, the head end server 30 couples to a satellite farm 20 of satellites 25 to receive national television programs associated with one or more broadcasting stations and operates to stream the national television programs to set top boxes (not shown) of subscribers 60a-60e via the media backend servers 40a and 40b and branch servers 50a-50c. In addition, the head end server 30 streams local television programs and VoD programs to the subscribers 60a-60e via the media backend servers 40a and 40b and branch servers 50a-50c. For example, the head end server 30 can stream television programs to the subscribers 60a-60e by multicasting the television programs over the packet-switched network.

The media backend server 40a provides IPTV services, such as Digital Rights Management (DRM) protection, client authentication, billing, subscriber management, and application enablement, for subscribers 60b. In addition, the media backend server includes a Backend Adapter 45 that sits between the remote, hosted operators' IPTV deployment (branch servers 50a-50c) and the shared head end server 30. The Backend Adapter 45 allows the hosting operator maintaining the head end server 30 and media backend servers 40a and 40b to resell live and/or VoD services in an a la carte method. For example, while one hosted operator may desire to purchase all available live and video on demand (VoD) services from the hosting operator, another hosted operator may only desire to purchase only a subset of the live and/or VoD content. Thus, smaller operators (e.g., operators of branch servers 50a-50c), which may not have the funding available to build a video head end, can purchase a customizable set of services from the hosted operator. For example, such a hosted solution could open the door for expanding the IPTV customer base to areas like hospitality. Large hotels, casinos and retailers could leverage a scaled-down video offering for marketing and customer retention.

In an exemplary operation, the Backend Adapter 45 intercepts, proxies and manipulates inbound web service calls from branch servers 50a-50c for service-related media metadata from the head end server 30 to ensure that only media metadata associated with the services purchased by the given operator is accessible. Such requests for service-related media metadata can include, for example, requests for lists of available services and requests for Digital Rights Management (DRM) keys to enable viewing of purchased media content. As such, the hosted operator branch (e.g., branch 50a) does not become aware of the existence of content which has not been purchased. For example, if branch server 50a sends a web service request to the head end server 30 to retrieve a list of all available live services, the Backend Adapter 45 will receive a full list of all available services from the head end server 30, but filter the return results such that the branch server 50a only receives a list of live services that they have purchased from the hosting operator.

Figure 2:
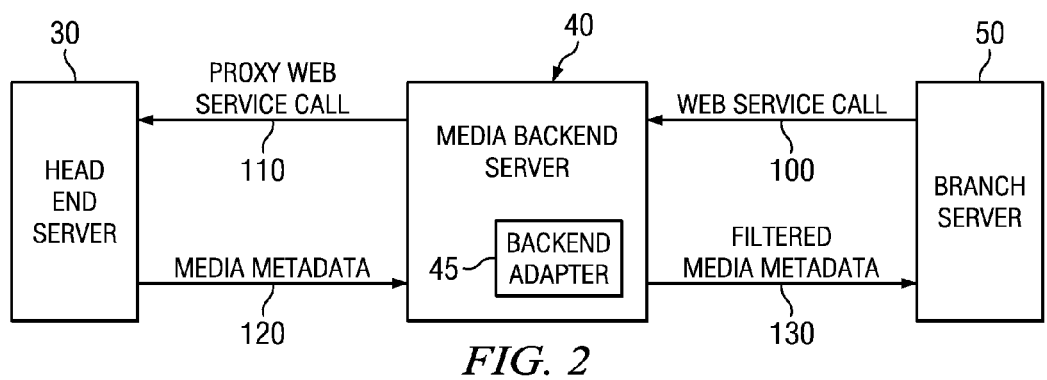
FIG. 2 illustrates an exemplary IPTV resell arrangement between operators, in accordance with embodiments of the present invention.

FIG. 2 illustrates an exemplary IPTV resell arrangement between operators, in accordance with embodiments of the present invention. In FIG. 2, the media backend server 40 operated by hosting operator provides a Backend Adapter 45 that introduces an intermediary or proxy between a branch server 50 operated by a host operator and the head end server of the hosting operator, thereby exposing an API to the branch server 50 and converting calls of the exposed API into calls defined by the head end server API.

For example, upon receiving a web service call 100 from the branch server 50 for media metadata, the Backend Adapter 45 can proxy the received web service call 110 to the head end server 30. In an exemplary embodiment, the web service call 100 transmitted by the branch server 50 is encapsulated in Simple Object Access Protocol (SOAP) over Hypertext Transfer Protocol (HTTP), with the underlying network protocol being Transmission Control Protocol/Internet Protocol (TCP/IP). The Backend Adapter 45 can translate the received web service call 100 into the proxy web service call 110 without manipulation of the SOAP or HTTP headers. In addition, when performing a proxy of the web service call 100, the Backend Adapter 40 may also forward a certificate from the Branch that allows the head end server 30 to validate the certificate encrypt the media metadata return result in a manner that the branch server 50 can decrypt. Moreover, the web service call 100 may be made via a Secure Sockets Layer (SSL) tunnel. Therefore, the Backend Adapter 45 can also serve as an SSL endpoint to the branch server 50 to avert a "man-in-the-middle" security scenario.

The head end server 30, upon receiving the proxy web service call 110 for media metadata, returns the requested media metadata 120 to the media backend server 40. The Backend Adapter 45 filters the returned metadata and provides the filtered media metadata 130 to the branch server 50 so that only metadata associated with the live or VoD services purchased by the hosted operator are allowed to pass back to the branch server 50. For example, a return result 120 containing DRM keys for all live services is converted to a return result 130 containing DRM keys for live services purchased by the hosted operator. The Backend Adapter 45 can determine the specific media metadata to be transmitted to the branch server 50, for example, by performing a translation of the IP address of the inbound web service call 100 to a corresponding hosted operator identifier, and use the hosted operator identifier to ascertain the live and VoD services purchased by the hosted operator. This assumes that the public IP addresses or the IP address range of each hosted operator is known and is unique.

In another embodiment, instead of filtering the returned media metadata 120, the Backend Adapter 45 can request only the media metadata for content purchased by the hosted operator from the head end server 30. For example, the Backend Adapter 45 can convert an inbound web service call 100 from the branch server 50 requesting all media metadata to a proxy web service call 110 that only requests specific media metadata associated with media content purchased by the hosted operator. In this embodiment, the media metadata 120 provided by the head end server 30 to the media backend server 40 is the filtered media metadata 130 that is provided from the media backend server 40 to the branch server 50. Therefore, the Backend Adapter 45 does not need to perform any filtering of the returned media metadata 120 and simply passes the returned media metadata 120 through to the branch server 50 as the filtered media metadata 130.

Figure 3:
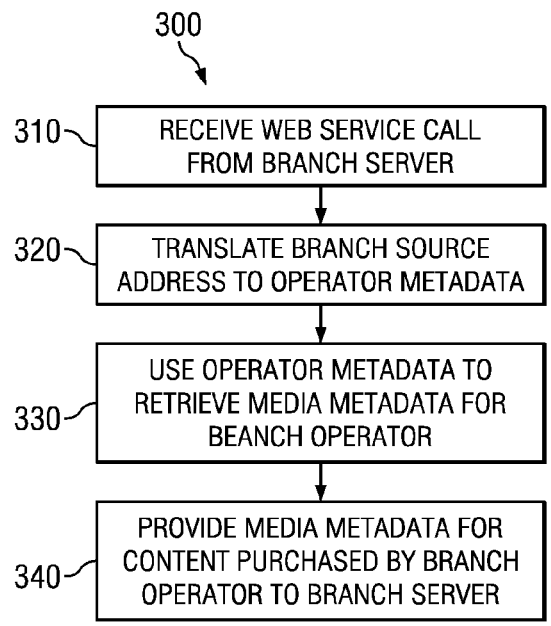
FIG. 3 is a flowchart illustrating an exemplary process for enabling reselling of IPTV services, in accordance with embodiments of the present invention.

FIG. 3 is a flowchart illustrating an exemplary process 300 for enabling reselling of IPTV services from a hosting operator to a hosted operator, in accordance with embodiments of the present invention. The method begins at block 310, where a web service call for media metadata associated with a plurality of media content is received from a branch server operated by the hosted operator at a media backend server operated by the hosting operator. At block 320, the media backend server translates a source IP address of the web service call to operator metadata of the hosted operator, in which the operator metadata indicates the particular media content purchased by the hosted operator from the hosting operator. At block 330, the media backend server uses the operator metadata to retrieve only the media metadata for media content purchased by the hosted operator, and at block 340, the media backend server transmits the retrieved media metadata to the branch server.

Figure 4:
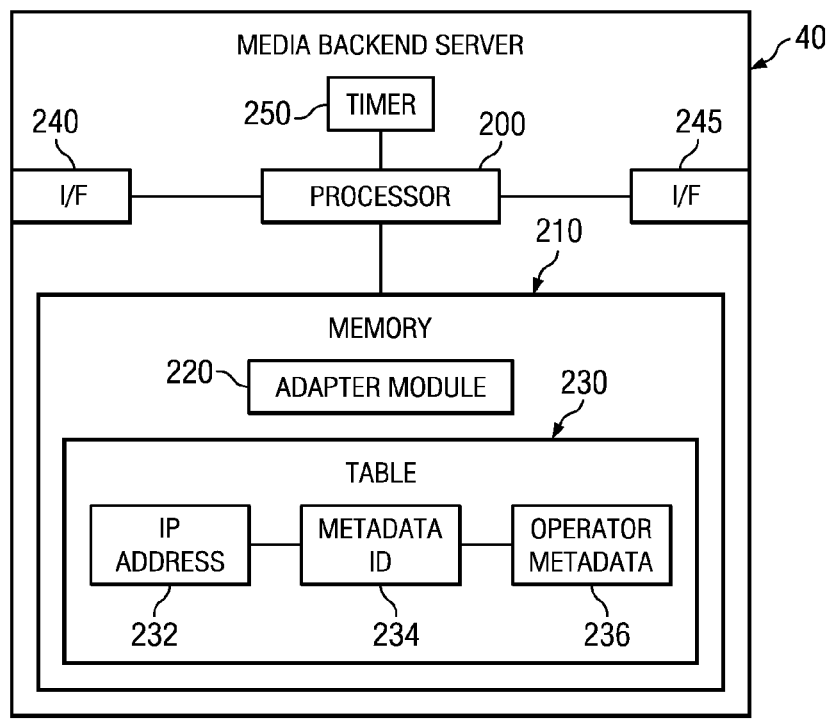
FIG. 4 is a block diagram illustrating an exemplary media backend server, in accordance with embodiments of the present invention.

FIG. 4 is a block diagram illustrating an exemplary media backend server 40, in accordance with embodiments of the present invention. The media backend server 40 includes a processor 200, memory 210 and network interfaces 240 and 245. The network interfaces 240 and 245 are coupled to a communication network, such as a packet-switched network, to provide IPTV services to subscribers. For example, network interface 240 can be coupled to a head end server via a packet-switched network, while network interface 245 can be coupled to a branch server of a hosted operator via a packet-switched network.

The memory 210 includes an adapter module 220, which contains software instructions executable by the processor 200 to implement the Backend Adapter 45 shown in FIGS. 1 and 2. For example, the processor 200 can execute instructions of the adapter module 220 to accept web service calls via network interface 245 from hosted operators' branch servers, perform a translation to operator content purchase parameters based on source IP address of the incoming web service call, proxy the web service call to the shared live/VoD head end server, intercept the return result and remove metadata and DRM key information for content which has not been purchased by the hosted operator and return the filtered data to the calling branch server.

To translate the source IP address of the web service call to the appropriate purchased content, the memory 210 further includes a table 230 or other data structure that maps operators-to-IP address ranges and operators-to-operator metadata to determine the collection(s) of purchased content for the translated operators. As shown in FIG. 4, the table 230 includes a list of source IP addresses 232, associated operator metadata identifiers 234 and associated operator metadata 236. Thus, the table 230 maps non-overlapping source IP address ranges 232 to operator metadata 236, consisting of, for example, the operator name and the set of collections of content purchased by the operator.

For example, for each hosted operator, the table 230 can maintain a source IP address range for each hosted operator branch server and map each of the source IP addresses 232 for each of the hosted operator branch servers to a single operator metadata identifier 234 for the hosted operator. Then, the table 230 can map each operator metadata identifier 232 to the operator metadata 236 for that hosted operator. By way of example, but not limitation, the operator metadata 236 can include the name of the hosted operator, a list of live content purchased by the hosted operator (which can be a list of individual services or a defined collection of services), a list of VoD content purchased by the hosted operator (which can be individual services or a defined collection of services) and an indication of whether the hosted operator uses/requires SSL for web service traffic protection.

In embodiments in which the list of live and/or VoD content is defined as a collection of services, the hosting operator can structure the resell of media content in tiers (e.g., Premium, Basic, VoD-only), in which each tier includes a list of live and/or VoD content included in the collection, specified as individual services and/or filter strings (e.g., "all live services with a title containing Network/Channel X"). Therefore, the operator metadata 236 need only include the name/title of the tier purchased by the hosted operator, and the memory 210 can maintain a separate mapping of tiers to services that can be applicable to multiple hosted operators.

In addition, instead of predefined tiers, the hosting operator could also allow the creation of custom groups or filters, which can be used to create collections of content for resell. Each custom group or filter can also be associated with another group or filter (i.e., nesting shall be allowed). For example, a hosting operator can create a "Network X Collection", which contains a static group of Network X live services as well as a filter which contains all subscription VoD assets with the provider set to Network X. Thus, the custom group can be a collection of content with static membership, while the filter can be a collection of content with dynamic membership.

The operator metadata 236 may also include a preferred time-out value for Live/VoD web service calls and/or a preferred time interval when the media backend server 40 queries the head end server for new live and VoD services. In another embodiment, the time-out value and query time interval can be set by the hosting operator. In either embodiment, the media backend server 40 can also include a timer 250 for determining when a time-out occurs and/or when a new query to the head end server should be performed.

For example, the media backend server 40 can periodically import the names/titles of all live and VoD content from the head end server, and present these as available for purchase to the hosted operators. The media backend server 40 can query for new live and VoD services based on a configurable time interval, specified, for example, in minutes, and initialize the timer 250 with the time interval after each new query.

As another example, the media backend server 40 can allow each operator to define a web service call time-out value, specified, for example, in number of seconds. If the value is assigned to 0, the media backend server 40 can interpret this as disabling the time-out feature. When the media backend server 40 proxies a web service call to the head end server, the media backend server 40 can initialize the timer 250 with the time-out value, and if a returned result is not received from the head end server prior to the expiration of the timer 250, the media backend server 40 can notify the branch server of the time-out and discard the web service call. In other embodiments, upon a time-out, the media backend server 40 can simply not respond to the hosted branch server.

In an exemplary operation, the media backend server 40 can receive a web service call from a particular hosted branch server via network interface 245. Upon receiving the web service call, the processor 200 can execute instructions of the adapter module 220 to extract the source IP address of the web service call and perform a translation of the source IP address of the web service call against the table 230 to determine the hosted operator name and set of collection(s) of purchased content for the hosted operator. The processor 200 can then execute instructions of the adapter module 220 to proxy the web service call to the head end server for processing via network interface 240. The processor 200 can further start the timer 250 for the proxy web service call when the call is forwarded to the head end server. If the timer expires before return results are received from the head end server, the processor 200 no longer continues to wait for a response and discards the web service call.

If return results are received from the head end server via network interface 240 prior to the expiration of the timer 250, the processor 200 stops the timer and executes instructions of the adapter module 220 to filter the media metadata and remove any media metadata for content that has not been purchased by the hosted operator controlling the requesting branch server. The processor 200 can then execute instructions of the adapter module 220 to forward the filtered media metadata to the requesting branch server.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein. In addition, as used herein, the term "memory" includes any type of data storage device, including but not limited to, a hard drive, random access memory (RAM), read only memory (ROM), flash memory, compact disc, floppy disc, ZIP® drive, tape drive, database or other type of storage device or storage medium.

Figure 5:
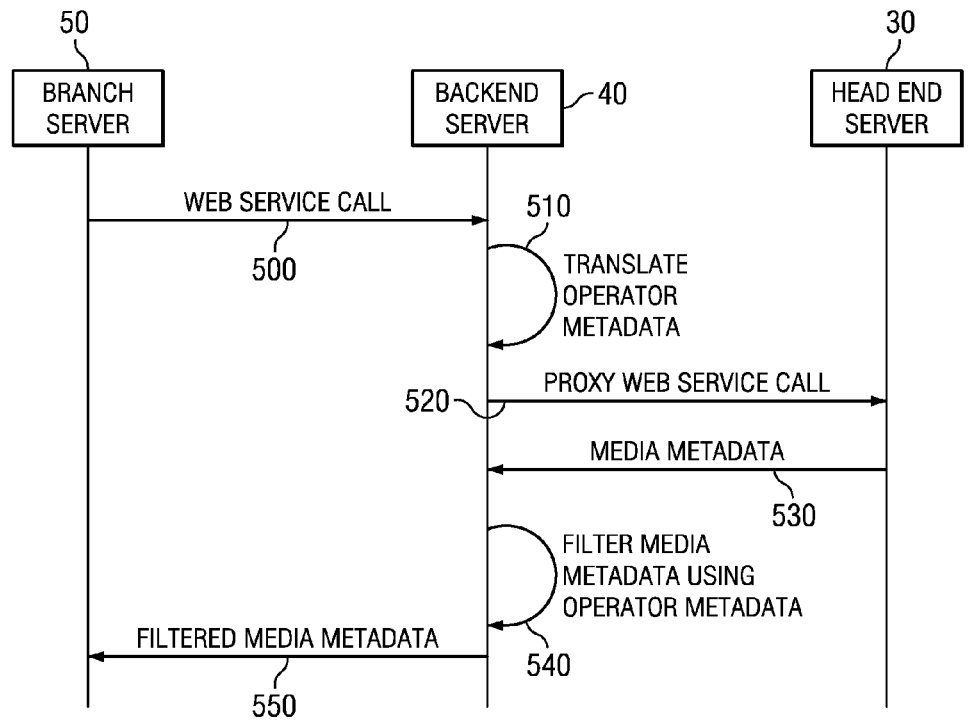
FIGS. 5 and 6 are flow diagrams illustrating exemplary provisioning of content between operators, in accordance with embodiments of the present invention.
Figure 6:
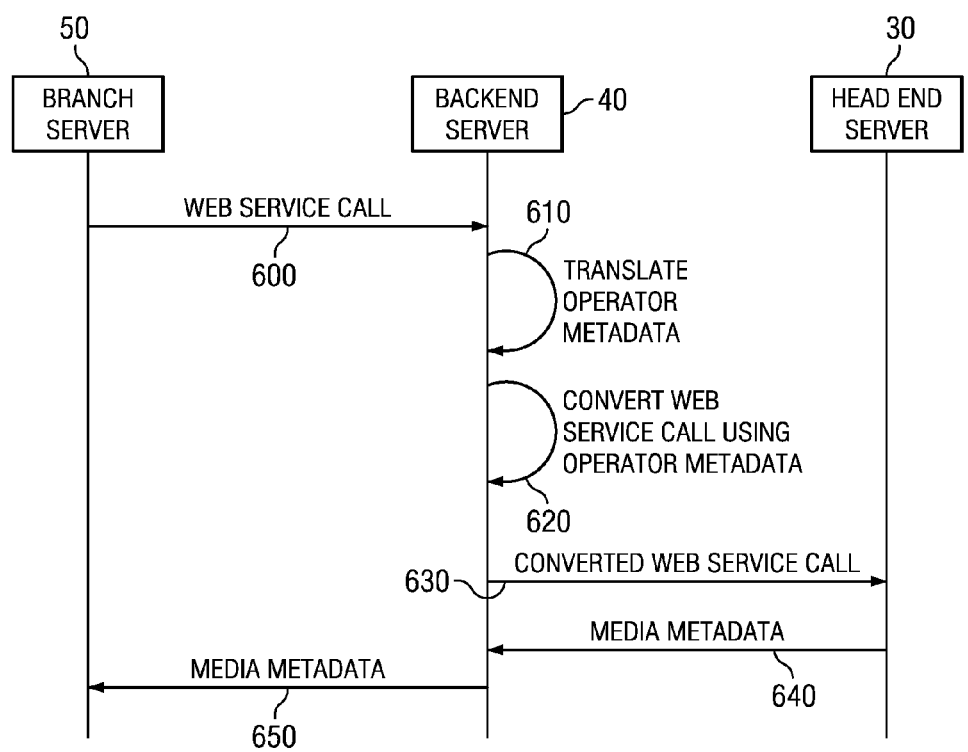

FIGS. 5 and 6 are flow diagrams illustrating exemplary provisioning of content between operators, in accordance with embodiments of the present invention. Turning first to FIG. 5, at 500, a branch server 50 owned and operated by a hosted operator transmits a web service call for media metadata associated with a plurality of media content to a media backend server 40 owned and operated by a hosting operator. At 510, the media backend server 40 translates the source IP address of the web service call to operator metadata for the hosted operator that indicates the particular media content purchased by the hosted operator from the hosting operator. Then, at 520, the media backend server 40 proxies the web service call to the head end server 30 of the hosted operator to retrieve, at 530, the media metadata for the plurality of media content requested by the branch server 50.

At 540, the media backend server 40 filters the returned media metadata per the set of collections of content purchased by the requesting/hosted operator, such that all metadata for content which has not been purchased is deleted. Thereafter, at 550, the filtered media metadata is transmitted from the media backend server 40 to the requesting Hosted branch server 50.

In another embodiment, as shown in FIG. 6, at 600, when the hosted branch server 50 transmits a web service call for media metadata associated with a plurality of media content to the hosting media backend server 40, at 610, the media backend server 40 again translates the source IP address of the web service call to operator metadata for the hosted operator that indicates the particular media content purchased by the hosted operator from the hosting operator.

However, unlike FIG. 5, at 620, the media backend server 40 then converts the web service call from a request for the media metadata for all media content to a request for the media metadata of only the content purchased by the hosted operator, and at 630, proxies the converted web service call to the head end server 30 of the hosted operator to retrieve, at 640, the media metadata for only the purchased media content. Thereafter, at 650, the media backend server 40 forwards the media metadata for the content purchased by the hosted operator back to the hosted branch server 50.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A media backend server within an Internet Protocol Television (IPTV) system operated by a hosting operator to enable tiered reselling of IPTV services to a hosted operator servicing at least one subscriber, the media backend server comprising:
    a network interface in the media backend server operated by the hosting operator coupled to an IPTV network to receive a web service call for a plurality of media content from a branch server operated by the hosted operator, to transmit a proxy web service call corresponding to the received web service call to a head end server operated by the hosting operator, to retrieve all available media metadata of the plurality of media content from the head end server in response to the proxy web service call, to filter the media metadata to generate filtered media metadata and to transmit the filtered media metadata to the branch server for distribution to the at least one subscriber, wherein the media backend server filters the media metadata to include only the filtered media metadata corresponding to purchased ones of the plurality of media content pre-purchased by the hosted operator from the hosting operator prior to the media backend server transmitting the proxy web service call to the head end server;
    a memory for storing operator metadata associated with the hosted operator, the operator metadata indicating the purchased ones of the plurality of media content for use in determining the filtered media metadata to be provided to the branch server operated by the hosted operator;
    a processor coupled to the network interface and the memory, the processor operable to translate the web service call to the proxy web service call and to identify the filtered media metadata to be transmitted to the branch server using the operator metadata; and
    wherein the branch server does not receive any indication of the plurality of media content that is not pre-purchased by the hosted operator.

2. The media backend server of claim 1, wherein the processor further operates to filter the received media metadata to produce the filtered media metadata using the operator metadata.

3. The media backend server of claim 1, wherein the received media metadata is the filtered media metadata and the processor is further operable to generate the proxy web service call for the filtered media metadata using the operator metadata.

4. The media backend server of claim 1, wherein the web service call includes indicia of the hosted operator, and the processor is further operable to translate the indicia of the hosted operator to the operator metadata.

5. The media backend server of claim 4, wherein the memory further includes a table having a plurality of source IP addresses, a plurality of operator metadata identifiers and a plurality of operator metadata, each of the plurality of source IP addresses being associated with one of the plurality of operator metadata identifiers and each of the plurality of operator metadata being associated with one of the plurality of operator metadata identifiers.

6. The media backend server of Clam 5, wherein each of the plurality of operator metadata includes a respective name of a respective operator associated therewith and a respective identifier of the purchased ones of the plurality of media content by the respective operator.

7. The media backend server of claim 1, wherein the media metadata and the filtered media metadata further includes a collection of digital rights management (DRM) keys.

8. The media backend server of claim 1, wherein the plurality of media content includes a collection of live media and video on demand media.

9. The media backend server of claim 1, wherein the network interface allows a secure sockets layer (SSL) tunnel to the branch server to receive the web service call.

10. The media backend server of claim 1, further comprising:
    a timer initialized upon transmission of the proxy web service call, and wherein the processor is operable to time out the proxy web service call upon expiration of the timer.

11. An Internet Protocol Television (IPTV) system enabling tiered reselling of IPTV services from a hosting operator to hosted operator servicing at least one subscriber of IPTV services, the system comprising:
    a branch server operated by the hosted operator and coupled to a network to transmit a web service call for a plurality of media content and to receive filtered media metadata for distribution to the at least one subscriber of IPTV services; and
    a media backend server operated by the hosting operator and coupled to the network to receive the web service call from the branch server, to proxy the web service call and transmit a proxy web service call to a head end server to retrieve all available media metadata of the plurality of media content of the IPTV services from the head end server in response to the proxy web service call and to transmit the filtered media metadata to the branch server;
    wherein the filtered media metadata corresponds to purchased ones of a plurality of media content of the IPTV services pre-purchased by the hosted operator from the hosting operator prior to the media backend server transmitting the proxy web service call to the head end server;
    wherein the media metadata and the filtered media metadata includes a list of only available ones of the plurality of media content of the IPTV services purchased by the hosted operator.

12. The system of claim 11, wherein the processor further operates to filter the received media metadata to produce the filtered media metadata.

13. The system of claim 11, wherein the received media metadata is the filtered media metadata and the processor is further operable to generate the proxy web service call for the filtered media metadata.

14. The system of claim 11, wherein the media backend server further includes a memory maintaining a table having a plurality of source IP addresses, a plurality of operator metadata identifiers and a plurality of operator metadata, each of the plurality of source IP addresses being associated with one of the plurality of operator metadata identifiers and each of the plurality of operator metadata being associated with one of the plurality of operator metadata identifiers, each of the operator metadata including a respective list of the purchased ones of the plurality of media content by the respective operator.

15. The system of claim 14, wherein:
the web service call includes a source IP address associated with the hosted operator, and the media backend server is further operable to use the table to translate the source IP address to the operator metadata identifier of the hosted operator and identify the filtered media metadata for transmission to the branch server based on the operator metadata associated with the operator metadata identifier of the hosted operator.

16. The system of claim 11, wherein the media metadata and the filtered media metadata further includes a collection of digital rights management (DRM) keys.

17. The system of claim 11, wherein the web service call is allowed to be made via a secure sockets layer (SSL) tunnel between the branch server and the media backend server.

18. A method for enabling tiered reselling of Internet Protocol Television (IPTV) services from a hosting operator to a hosted operator servicing a plurality of subscribers of the IPTV services, the method comprising:
receiving a web service call for a plurality of media content of the IPTV services from a branch server operated by the hosted operator at a media backend server operated by the hosting operator of the IPTV services;
accessing a memory that includes a plurality of operator metadata associated with a plurality of hosted operators, the operator metadata indicating the purchased ones of the plurality of media content of the IPTV services for each of the plurality of hosted operators;
translating an indicia of the hosted operator within the web service call to one of the plurality of operator metadata associated with the hosted operator, the operator metadata indicating only purchased ones of the plurality of media content of the IPTV services purchased by the hosted operator from the hosting operator such that only media metadata associated with the IPTV services purchased by the hosted operator is accessible by the hosted operator, wherein the purchased ones of the plurality of media content of the IPTV services purchased by the hosted operator from the hosting operator includes live services and video on demand services;
using the operator metadata to transmit a proxy web service call corresponding to the received web service call to a head end server to retrieve filtered media metadata from the head end server for the purchased ones of available media metadata of the plurality of media content of the IPTV services;
transmitting by the hosting operator of the IPTV services the filtered media metadata to the branch server operated by the hosted operator of the IPTV services for distribution to the plurality of subscribers of the IPTV services, wherein the hosting operator pre-purchases the purchased ones of the plurality of media content of the IPTV services from the hosting operator prior to the media backend server transmitting the proxy web service call to the head end server and wherein the hosted operator branch does not become aware of the IPTV services which have not been pre-purchased;
wherein the filtered media metadata includes a collection of available ones of the plurality of media content of the IPTV services.

19. The method of claim 18, wherein the using the operator metadata to retrieve the media metadata further comprises:
transmitting a proxy web service call to a head end server to retrieve media metadata for the plurality of media content from the head end server; and
filtering the media metadata using the operator metadata to produce the filtered media metadata.

20. The method of claim 19, wherein the using the operator metadata to retrieve the filtered media metadata further comprises:
converting the web service call to a proxy web service call for the filtered media metadata corresponding to the purchased ones of the plurality of media content using the operator metadata; and
transmitting the proxy web service call to a head end server to retrieve the filtered media metadata from the head end server.

* * * * *